(12) United States Patent
Balasubramanian et al.

(10) Patent No.: US 11,163,604 B2
(45) Date of Patent: Nov. 2, 2021

(54) PEER-TO-PEER TRANSFER OF EDGE COMPUTING BASED ON AVAILABILITY SCORES

(71) Applicant: International Business Machines Corporation, Armonk, NY (US)

(72) Inventors: Swaminathan Balasubramanian, Troy, MI (US); Sarbajit K. Rakshit, Kolkata (IN); Ravi Prakash Bansal, Tampa, FL (US); Pierre C. Berlandier, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 16/733,847

(22) Filed: Jan. 3, 2020

(65) Prior Publication Data

US 2021/0208930 A1 Jul. 8, 2021

(51) Int. Cl.
*G06F 9/48* (2006.01)
*G06F 9/50* (2006.01)

(52) U.S. Cl.
CPC .......... *G06F 9/4862* (2013.01); *G06F 9/5044* (2013.01); *G06F 9/5094* (2013.01)

(58) Field of Classification Search
CPC .... G06F 9/4862; G06F 9/5044; G06F 9/5094; G06F 2221/0788; G05B 2219/1137
See application file for complete search history.

(56) References Cited

U.S. PATENT DOCUMENTS 10,827,033 B1* 11/2020 Balasubramanian ... H04L 67/12
2012/0158991 A1 6/2012 Ajjaguttu et al.
(Continued)

FOREIGN PATENT DOCUMENTS

WO WO2018082709 A1 5/2018

OTHER PUBLICATIONS

A. Jonathan, M. Uluyol, A. Chandra and J. Weissman, "Ensuring reliability in geo-distributed edge cloud," 2017 Resilience Week (RWS), 2017, pp. 127-132, doi: 10.1109/RWEEK.2017.8088660. (Year: 2017).*

(Continued)

*Primary Examiner* — Jorge A Chu Joy-Davila
(74) *Attorney, Agent, or Firm* — Yee & Associates, P.C.

(57) ABSTRACT

Peer-to-peer transfer of compute function state in an edge computing ecosystem is provided. An availability score corresponding to a mobile computing device is received. It is determined whether the availability score is less than an availability score threshold. In response to determining that the availability score is less than the availability score threshold, departure coordinates of the mobile computing device from the edge computing ecosystem and departure time are determined. At least one peer mobile computing device is identified having a corresponding availability score greater than the availability score threshold, a corresponding security profile that at least matches a security profile of the mobile computing device, and a corresponding compute power capability that at least matches a compute power capability of the mobile computing device. A compute function state of the mobile computing device is transferred to the at least one peer mobile computing device.

19 Claims, 4 Drawing Sheets

(56) References Cited

U.S. PATENT DOCUMENTS

| | | | |
|---|---|---|---|
| 2013/0212212 A1* | 8/2013 | Addepalli | G06F 9/461 709/217 |
| 2015/0347245 A1* | 12/2015 | Andre | G06F 11/2069 714/6.3 |
| 2017/0272342 A1 | 9/2017 | Zessin et al. | |
| 2018/0295546 A1* | 10/2018 | Crawford | H04W 36/0083 |
| 2019/0020657 A1 | 1/2019 | Egner et al. | |
| 2019/0138934 A1* | 5/2019 | Prakash | G06K 9/00993 |
| 2019/0141120 A1* | 5/2019 | Bernat | H04L 67/327 |
| 2019/0158606 A1* | 5/2019 | Guim Bernat | H04W 4/40 |

OTHER PUBLICATIONS

Habib Ur Rehman et al., "RedEdge: A Novel Architecture for Big Data Processing in Mobile Edge Computing Environments," Journal of Sensor and Actuator Networks, vol. 6, 2017, 22 pages.

Jalali et al., DEFT: Dynamic Edge Fabric environmenT, 2019 IEEE International Conference on Edge Computing (EDGE), IEEE, 2019, pp. 77-86.

Yu, "Multi-User Computation Offloading in Mobile Edge Computing," Thesis, Submitted for the degree of Doctor of Philosophy of Sorbonne Universit'e, Apr. 30, 2018, 133 pages.

* cited by examiner

PEER-TO-PEER TRANSFER OF EDGE COMPUTING BASED ON AVAILABILITY SCORES

BACKGROUND

1. Field

The disclosure relates generally to edge computing and more specifically to peer-to-peer transfer of edge computing based on mobile computing device availability scores.

2. Description of the Related Art

The explosive growth of Internet of Things (IoT) devices has resulted in unprecedented volumes of data. And data volumes will continue to grow as fifth-generation (5G) networks increase the number of connected mobile devices. The unprecedented scale and complexity of data that is generated by these connected devices has outpaced network and infrastructure capabilities.

Sending all this device-generated data to a centralized data center or to a cloud environment for processing causes bandwidth and latency issues. Edge computing offers a more efficient alternative of processing and analyzing data closer to the point where it is generated. Because data does not traverse over a network to a cloud or data center in order to be processed, latency is reduced. Edge computing enables faster and more comprehensive data analysis, creating the opportunity for decreased network traffic, faster response times, and improved customer experiences. Multi-access edge computing is a network architecture concept that offers cloud computing capabilities with an IT service environment at the edge of the network. Basically, multi-access edge computing runs applications and performs related processing closer to where the data is generated improving application performance.

SUMMARY

According to one illustrative embodiment, a method for peer-to-peer transfer of compute function state in an edge computing ecosystem is provided. A mobile computing device receives an availability score corresponding to the mobile computing device on a periodic basis. The mobile computing device determines whether the availability score is less than a predefined minimum availability score threshold level. In response to the mobile computing device determining that the availability score is less than the predefined minimum availability score threshold level, the mobile computing device determines departure coordinates of the mobile computing device from the edge computing ecosystem and departure time. The mobile computing device identifies at least one peer mobile computing device having a corresponding availability score greater than the predefined minimum availability score threshold level, a corresponding security profile that at least matches a security profile of the mobile computing device, and a corresponding compute power capability that at least matches a compute power capability of the mobile computing device. The mobile computing device transfers a compute function state of the mobile computing device to the at least one peer mobile computing device. According to other illustrative embodiments, a mobile computing device and computer program product for peer-to-peer transfer of compute function state in an edge computing ecosystem are provided.

DETAILED DESCRIPTION

Figure 1:
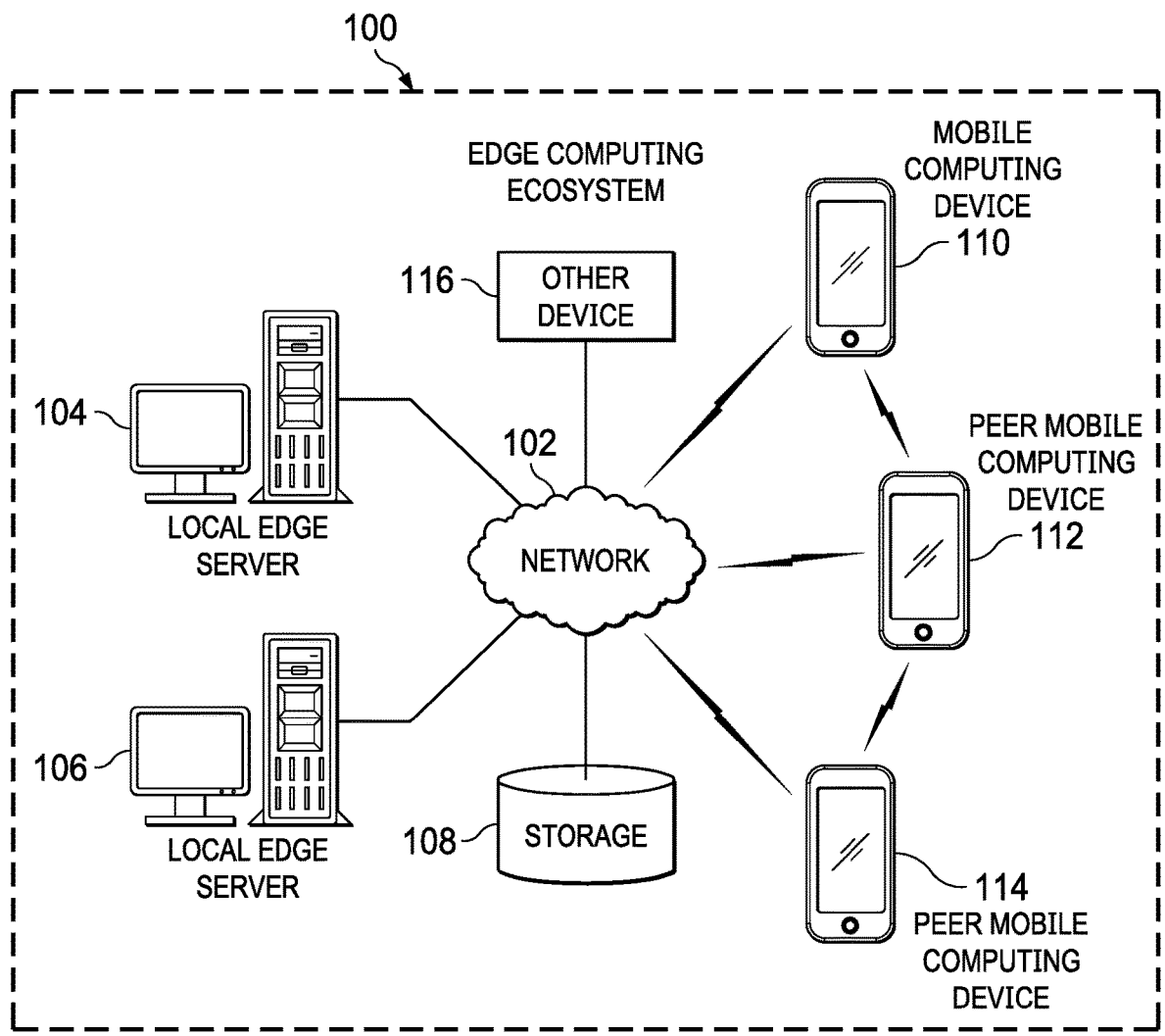
FIG. 1 is a pictorial representation of an edge computing ecosystem in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
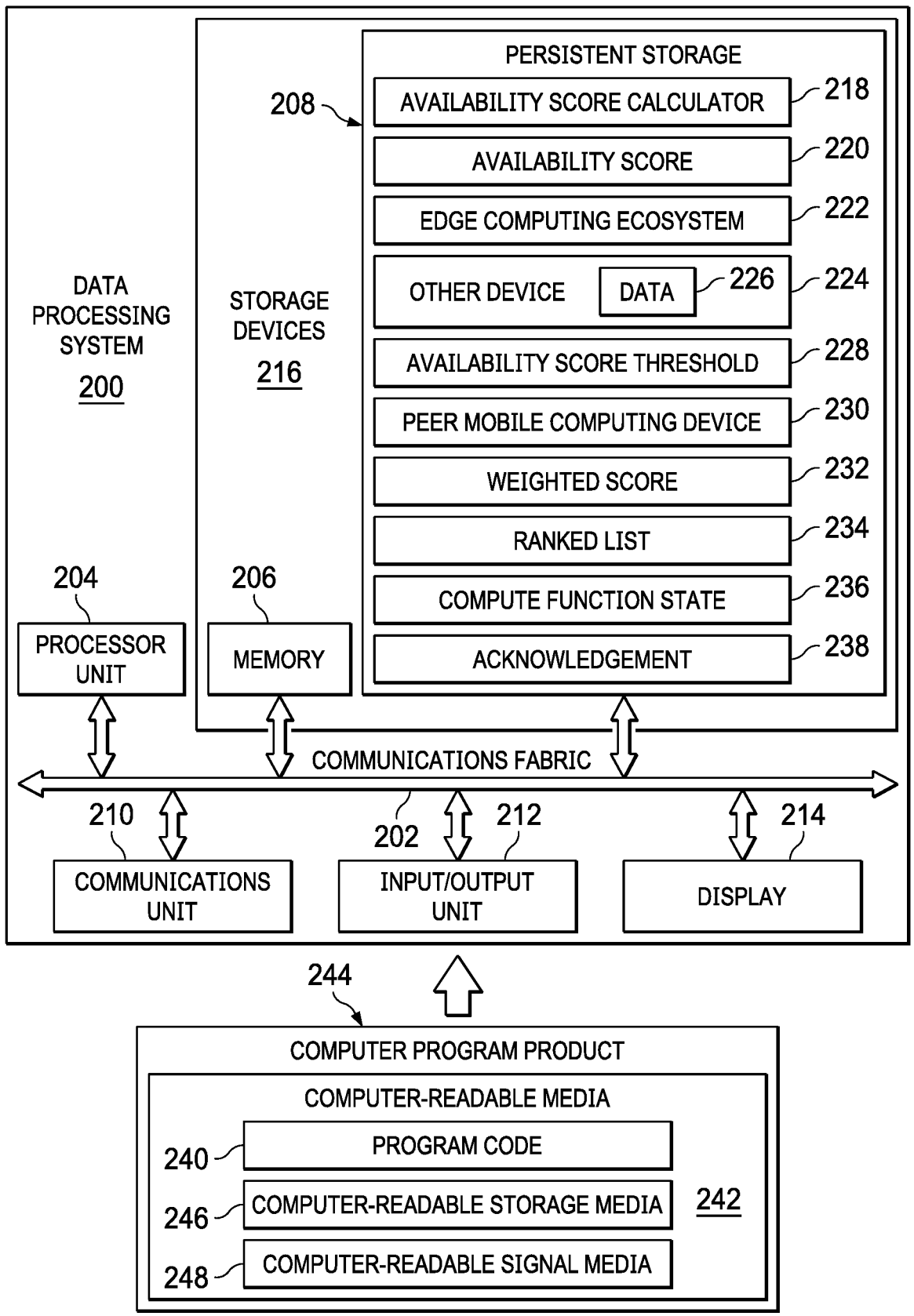
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of an edge computing ecosystem in which illustrative embodiments may be implemented. Edge computing ecosystem 100 is a network of computers, data processing systems, and other devices in which the illustrative embodiments may be implemented. Edge computing ecosystem 100 supports the processing and exchange of data that supports various types of computing services. Edge computing ecosystem 100 may be, for example, a multi-access edge computing system. Edge computing ecosystem 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, local edge server 104 and local edge server 106 connect to network 102, along with storage 108. Local edge server 104 and local edge server 106 may be, for example, server computers with high-speed connections to network 102. In addition, local edge server 104 and local edge server 106 may provide one or more services to client devices.

Mobile computing device 110, peer mobile computing device 112, peer mobile computing device 114, and other device 116 also connect to network 102. Mobile computing device 110, peer mobile computing device 112, and peer mobile computing device 114 are clients of local edge server 104 and local edge server 106 and may periodically receive availability scores from local edge server 104 and/or local edge server 106 while mobile computing device 110, peer mobile computing device 112, and peer mobile computing device 114 operate within edge computing ecosystem 100. Alternatively, mobile computing device 110, peer mobile computing device 112, and peer mobile computing device 114 may each generate their own availability score on a periodic basis. An availability score indicates a level or degree of availability and/or capability of a mobile computing device to process data generated by another device operating within edge computing ecosystem 100.

Further, peer mobile computing device 112 and peer mobile computing device 114 are peers of mobile computing device 110 and vice versa. In other words, mobile computing device 110, peer mobile computing device 112, and peer mobile computing device 114 are capable of peer-to-peer transfer of data, such as, for example, compute function state, among devices.

In this example, mobile computing device 110, peer mobile computing device 112, and peer mobile computing device 114 are shown as smart phones with wireless communication links to network 102. However, it should be noted that mobile computing device 110, peer mobile computing device 112, and peer mobile computing device 114 are examples only and may represent other types of mobile data processing systems, such as, for example, laptop computers, handheld computers, cellular phones, smart watches, smart glasses, smart vehicles, activity monitoring devices, gaming devices, robotic devices, and the like, with wireless communication links to network 102. In other words, mobile computing device 110, peer mobile computing device 112, and peer mobile computing device 114 may represent any type of data processing device capable of movement while operating within edge computing ecosystem 100.

Other device 116 represents another type of electronic device or apparatus operating within edge computing ecosystem 100 and may represent a plurality of other devices operating within edge computing ecosystem 100. Other device 116 may be, for example, an IoT-based sensor or fixed sensor that performs a monitoring function within edge computing ecosystem 100. However, it should be noted that in this example other device 116 does not possess sufficient processing capability to process the data generated by other device 116.

Because other device 116 does not possess sufficient processing capability to process the data generated by other device 116, mobile computing device 110 collects and processes the data generated by other device 116 while mobile computing device 110 operates within edge computing ecosystem 100. When mobile computing device 110 determines that mobile computing device 110 is about to depart from edge computing ecosystem 100 based on its availability score, mobile computing device 110 stops processing the data generated by other device 116, saves compute function state corresponding to the processing of the data generated by other device 116, transfers the compute function state to at least one of peer mobile computing device 112 and peer mobile computing device 114, and requests acknowledgement of receipt of the compute function state.

Storage 108 is a network storage device capable of storing any type of data in a structured format or an unstructured format. In addition, storage 108 may represent a plurality of network storage devices. Further, storage 108 may store identifiers for a plurality of mobile computing devices and other devices associated with edge computing ecosystem 100, historical mobile computing device availability patterns within edge computing ecosystem 100, historical correlation among mobile computing device users within edge computing ecosystem 100, historical mobile computing device user profiles, and the like.

In addition, it should be noted that network data processing system 100 may include any number of additional edge servers, mobile computing devices, storage devices, and other devices not shown. Program code located in network data processing system 100 may be stored on a computer readable storage medium and downloaded to a computer or other data processing device for use. For example, program code may be stored on a computer readable storage medium on local edge server 104 and downloaded to mobile computing device 110 over network 102 for use on mobile computing device 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a mobile computing device, such as mobile computing device 110, peer mobile computing device 112, or peer mobile computing device 114 in FIG. 1, in which computer readable program code or instructions implementing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, or some combination of the above.

In this example, persistent storage 208 stores availability score calculator 218. However, it should be noted that even though availability score calculator 218 is illustrated as residing in persistent storage 208, in an alternative illustrative embodiment availability score calculator 218 may be a separate component of data processing system 200. For example, availability score calculator 218 may be a hardware component coupled to communication fabric 202 or a combination of hardware and software components. In another alternative illustrative embodiment, a first set of components of availability score calculator 218 may be located in data processing system 200 and a second set of components of availability score calculator 218 may be located in a second data processing system, such as, for example, local edge server 104 in FIG. 1. In yet another alternative illustrative embodiment, availability score calculator 218 may be located in the local edge server in addition to, or instead of, data processing system 200.

Availability score calculator 218 calculates availability score 220 for data processing system 200 while data processing system 200 operates within edge computing ecosystem 222. Edge computing ecosystem 222 represents an identifier of an edge computing ecosystem, such as, for example, edge computing ecosystem 100 in FIG. 1. Availability score calculator 218 calculates availability score 220 for data processing system 200 based on, for example, volume of data generated by other device 224 within edge computing ecosystem 222; available computing power, battery power, storage space, memory, and software capability of data processing system 200; current activity of a user corresponding to data processing system 200 while located in edge computing ecosystem 222; electronic calendar engagement entries scheduled to occur at a location within edge computing ecosystem 222; historical availability patterns of data processing system 200 within edge computing ecosystem 222; speech analysis of the user while the user utilizes data processing system 200 to communicate with other individuals; historical correlation among users of mobile data processing systems within edge computing ecosystem 222; historical profile of the user corresponding to data processing system 200; data collected from internal sensors of data processing system 200 indicating mobility pattern, speed of movement, direction of movement, and relative position of data processing system 200 within edge computing ecosystem 222; manual input by the user of data processing system 200; and the like.

Other device 224 represents an identifier of an electronic device operating within edge computing ecosystem 222. Other device 224 may be, for example, other device 116 in FIG. 1. Other device 224 may represent a set of one or more other devices and may be, for example, a set of one or more IoT sensors operating within edge computing ecosystem 222. Other device 224 generates data 226 (e.g., sensor data). However, other device 224 is not capable of processing all or a portion of data 226. As a result, data processing system 200 processes all or a portion of data 226 generated by other device 224.

Availability score 220 indicates the availability and/or capability of data processing system 200 to process all or a portion of data 226 while data processing system 200 operates within edge computing system 222. Availability score calculator 218 compares availability score 220 of data processing system 200 to availability score threshold 228. Availability score threshold 228 is a predefined minimum availability threshold level.

If availability score 220 corresponding to data processing system 200 is greater than availability score threshold 228, then data processing system 200 continues to process data 226 generated by other device 224. If availability score 220 corresponding to data processing system 200 is less than or equal to availability score threshold 228, then data processing system 200 searches for at least one peer mobile computing device, such as peer mobile computing device 230, to transfer the compute function state associated with processing data 226 to. Peer mobile computing device 230 represents an identifier of a peer mobile computing device, such as, for example, peer mobile computing device 112 in FIG. 1, and may represent a set of one or more peer mobile computing devices available and capable of processing data 226 (i.e., peer mobile computing devices having corresponding availability scores above availability score threshold 228).

If peer mobile computing device 230 represents two or more peer mobile computing devices with corresponding availability scores above availability score threshold 228, then availability score calculator 218 generates weighted score 232 for each respective peer mobile computing device having a corresponding availability score above availability score threshold 228. Availability score calculator 218 generates weighted score 232 for each respective peer mobile computing device having a corresponding availability score greater than availability score threshold 228 based on a plurality of device characteristics. The plurality of device characteristics include, for example, availability score and predicted duration of availability of each respective peer mobile computing device within edge computing ecosystem 222; compute power capability of each respective peer mobile computing device; processing resource availability, such as, for example, available battery power, available storage capacity, available memory, and the like, of each respective peer mobile computing device; and make and model of each respective peer mobile computing device.

Afterward, availability score calculator 218 generates ranked list 234 based on weighted score 232 of each respective peer mobile computing device. Ranked list 234 represents a list of peer mobile computing devices ordered by corresponding weighted score (e.g., from highest to lowest ranking (i.e., highest to lowest weighted score)). Availability score calculator 218 selects the highest-ranking mobile computing device (peer mobile computing device 230 in this example) to transfer compute function state 236 to.

Compute function state 236 represents a computing state of data processing system 200 when data processing system 200 stopped processing data 226 generated by other device 224 based on availability score 220 of data processing system 200 dropping below availability score threshold 228. Data processing system 200 transfers compute function state 236 to peer mobile computing device 230 for peer mobile computing device 230 to continue the processing of data 226 generated by other device 224. In addition, data processing system 200 requests acknowledgement 238 from peer mobile computing device 230 regarding receipt of compute function state 236. If data processing system 200 does not receive acknowledgement 238, then data processing system selects another peer computing device (e.g., next highest-ranking peer computing device in ranked list 234) to transfer compute function state 236 to.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, near field communication, global system for mobile communications (GSM), code division multiple access (CDMA), second-generation (2G), third-generation (3G), fourth-generation (4G), 4G Long Term Evolution (LTE), LTE Advanced, 5G, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 240 is located in a functional form on computer readable media 242 that is selectively removable and may be loaded onto or transferred to data processing system 200 for running by processor unit 204. Program code 240 and computer readable media 242 form computer program product 244. In one example, computer readable media 242 may be computer readable storage media 246 or computer readable signal media 248. Computer readable storage media 246 may include, for example, an optical or magnetic disc that is inserted or placed into a drive or other device that is part of persistent storage 208 for transfer onto a storage device, such as a hard drive, that is part of persistent storage 208. Computer readable storage media 246 also may take the form of a persistent storage, such as a hard drive, a thumb drive, or a flash memory that is connected to data processing system 200. In some instances, computer readable storage media 246 may not be removable from data processing system 200.

Alternatively, program code 240 may be transferred to data processing system 200 using computer readable signal media 248. Computer readable signal media 248 may be, for example, a propagated data signal containing program code 240. For example, computer readable signal media 248 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 240 may be downloaded over a network to persistent storage 208 from another device or data processing system through computer readable signal media 248 for use within data processing system 200. For instance, program code stored in a computer readable storage media in a data processing system may be downloaded over a network from the data processing system to data processing system 200. The data processing system providing program code 240 may be a server computer, a client computer, or some other device capable of storing and transmitting program code 240.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 246 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Edge computing brings memory and computing power closer to the location where the memory and computing power are needed. Edge computing is a distributed computing paradigm in which computation is largely or completely performed on distributed computing device nodes. Edge computing pushes applications, data, and computing power (e.g., services) away from centralized points to locations closer to the user (i.e., on the edge of the network). For example, a mobile computing device within an edge computing ecosystem can use its own hardware and software as local services for processing data collected from other devices, such as, for example, IoT-based sensors, which are also located within the edge computing ecosystem. In this case, the other devices (e.g., IoT sensors) do not have available memory or processing capability, but the mobile computing devices present within the edge computing ecosystem are capable of processing the data locally.

Prior solutions, upon determining that a mobile computing device was exiting an edge computing ecosystem, would halt computations on the exiting mobile computing device, save state, and transfer the computations to another existing computing devices in the edge computing ecosystem via a central orchestrator. This prior solution process, along with its attendant scheduling function, is inefficient in a mobile computing device ecosystem where mobile computing devices frequently enter and exit the edge computing ecosystem. As a result, a more efficient peer-to-peer computation transfer process based on a peer device's availability and capability is needed.

In a mobile computing device-based edge computing ecosystem, illustrative embodiments proactively perform peer-to-peer transfer of compute functions based on an evaluation of the availability and capability of individual mobile computing devices. Illustrative embodiments utilize an availability score computation to determine availability and capability of each mobile computing device in the edge computing ecosystem. When illustrative embodiments predict a change in mobile computing device availability in the edge computing ecosystem (i.e., a mobile computing device exiting the edge computing ecosystem), illustrative embodiments locate a mobile computing device having a highest availability score within the edge computing ecosystem and transfer compute functions to that mobile computing peer device without requiring intervention of a central coordination component.

It should be noted that illustrative embodiments are not focused on the mechanics of transferring compute functions, but instead focused on: 1) predicting that a mobile computing device in the edge computing ecosystem (e.g., multi-access edge computing system) is exiting the edge computing ecosystem; 2) identifying and selecting a peer mobile computing device that may or may not currently be part of the edge computing ecosystem and is predicted to be available within the edge computing ecosystem when the mobile computing device exits; and 3) proactively transferring compute functions of the mobile computing device exiting the edge computing ecosystem to the selected peer mobile computing device.

Illustrative embodiments run on mobile computing devices participating in the edge computing ecosystem. On a periodic basis, each mobile computing device within the edge computing ecosystem receives its availability score. It should be noted that a mobile computing device may receive the availability score from an availability score calculation engine located on the mobile computing device, itself, or on a local edge server, which is part of the edge computing ecosystem. The availability score calculation engine calculates the availability score based on, for example, at least one of: volume of data generated by various devices (e.g., IoT sensors) within the edge computing ecosystem; available computing power, memory, and software capability of the mobile computing device; current activity being performed by a user of the mobile computing device in the edge computing ecosystem, such as being stationary, walking, running, driving, and the like; electronic calendar entries, such as an appointment or activity, scheduled to occur at a location within an area of the edge computing ecosystem; historical mobile computing device availability patterns within the edge computing ecosystem; speech analysis of the mobile computing device user (e.g., identifying an indication that the user is leaving the area in the next few minutes based on a current conversation); historical correlation among mobile computing device users within the edge computing ecosystem (e.g., when user A leaves the area, then user B will also be leaving); historical user profile (e.g., duration of previous stays in the area by the user); data collected from internal sensors of the mobile computing device indicating, for example, mobility pattern, speed of movement, direction of movement, and relative position of the mobile computing device within the edge computing ecosystem; manual input from the mobile computing device user; and the like.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

When the availability score of a mobile computing device falls below a predefined minimum availability score threshold level, then illustrative embodiments predict departure coordinates of the mobile computing device from the edge computing ecosystem, along with predicted timestamp of the departure. In addition, illustrative embodiments identify and locate at least one peer mobile computing device having at least the following device features, such as: an availability score of the peer mobile computing device that is above the predefined minimum availability score threshold level; a security profile of the peer mobile computing device (e.g., a second mobile computing device owned by the user) that either has a matching security level or has a greater security level (e.g., more secure) than a security profile of the mobile computing device predicted to leave the edge computing ecosystem; and a compute capability of the peer mobile computing device that at least matches the compute capability of the mobile computing device predicted to leave the edge computing ecosystem. It should be noted that illustrative embodiments do not require the peer mobile computing device to already be included in the edge computing ecosystem, but that the peer mobile computing device is predicted to be a part of the edge computing ecosystem when the mobile computing device departs from the edge computing ecosystem.

When illustrative embodiments identify a plurality of peer mobile computing devices to replace the compute power of the departing mobile computing device, illustrative embodiments calculate a score for each of these identified peer mobile computing devices based on the following device characteristics: predicted availability score and predicted duration of availability of each respective peer mobile computing device within the edge computing ecosystem, compute power capability of each respective peer mobile computing device; processing resource availability, such as, for example, available battery power or charge, available storage capacity, available memory, and the like, of each respective peer mobile computing device; and make and model of each respective peer mobile computing device.

Then, illustrative embodiments apply a corresponding weighting factor to each respective device characteristic listed above to influence selection of a particular peer mobile computing device from the identified plurality of peer mobile computing devices. For example, illustrative embodiments may prefer a slightly older model peer computing device with a greater predicted availability score and processing resources over a newer model peer computing device with lesser processing resources and predicted availability score. After applying the corresponding weighting factor to each respective device characteristic listed above, illustrative embodiments rank each respective device in the identified plurality of the mobile computing devices based on a corresponding weighted score and select the highest-ranking peer mobile computing device for transferring the compute function to. Illustrative embodiments then direct the mobile computing device departing from the edge computing ecosystem to stop processing the data generated by the other device (e.g., IoT sensor) within the edge computing ecosystem, save the compute function state corresponding to the processing of the data by the mobile computing device, transfer the compute function state to the highest-ranking peer mobile computing device, and request acknowledgement of receiving the compute function state from the peer mobile computing device.

Illustrative embodiments define the weighted scoring function "f(pi)", where "pi" represents a particular peer mobile computing device against the device characteristics listed above, as:

$$f(pi)=w1*av(pi)+w2*c(pi)+w3*r(pi)+w4*m(pi),$$

where "w1", "w2", "w3", and "w4" represent weighting factors for predicted availability score, compute power capability, processing resource availability, and make and model of the peer mobile computing device, respectively. Illustrative embodiments model the predicted availability score function "av(pi)" as a simple step function based on the availability distance of the peer mobile computing device, "pi", to the mobile computing device leaving the edge computing ecosystem. The compute power capability function "c(pi)" captures the compute power capability of the peer mobile computing device, "pi". Once illustrative embodiments know the make and model of the peer mobile computing device, illustrative embodiments utilize publicly available benchmark scores corresponding to the processor of the peer mobile computing device normalized to the mobile computing device leaving the edge computing ecosystem to determine the compute power capability function "c(pi)". The processing resource availability function "r(pi)" is a multivariate step function that illustrative embodiments use to score the peer mobile computing device based on a set of distance functions between the mobile computing device leaving the edge computing ecosystem and the peer mobile computing device against each of a set of device attributes, such as available battery charge, available storage capacity, available memory capacity, and the like. Illustrative embodiments utilize the make and model function "m(pi)" to score each peer mobile computing device relative to the mobile computing device leaving the edge computing ecosystem (e.g., normalization) based on how much newer or older each peer computing device is compared to the mobile computing device leaving the edge computing ecosystem. This can be achieved by illustrative embodiments maintaining a matrix of all publicly available mobile computing devices. For example, the matrix may be centered around the mobile computing device's make and model with newer peer computing devices scoring higher.

Thus, illustrative embodiments provide one or more technical solutions that overcome a technical problem with transfer of edge computing by periodically calculating availability scores of mobile computing devices in an edge computing ecosystem for peer-to-peer transfer of compute function when a mobile computing device leaves the edge computing ecosystem. As a result, these one or more technical solutions provide a technical effect and practical application in the field of edge computing.

Figure 3A:
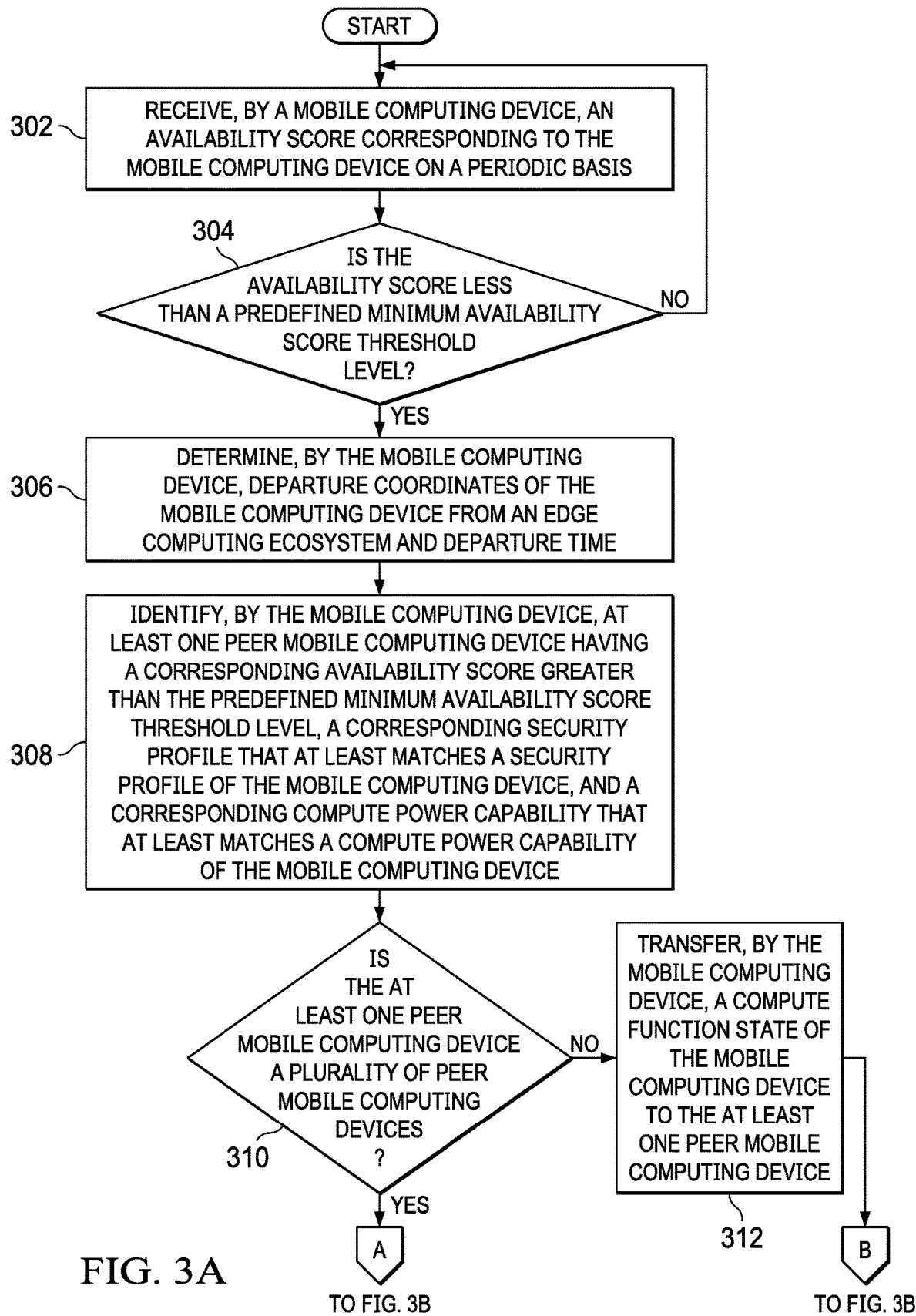
FIGS. 3A-3B are a flowchart illustrating a process for peer-to-peer transfer of compute function state in an edge computing ecosystem in accordance with an illustrative embodiment.
Figure 3B:
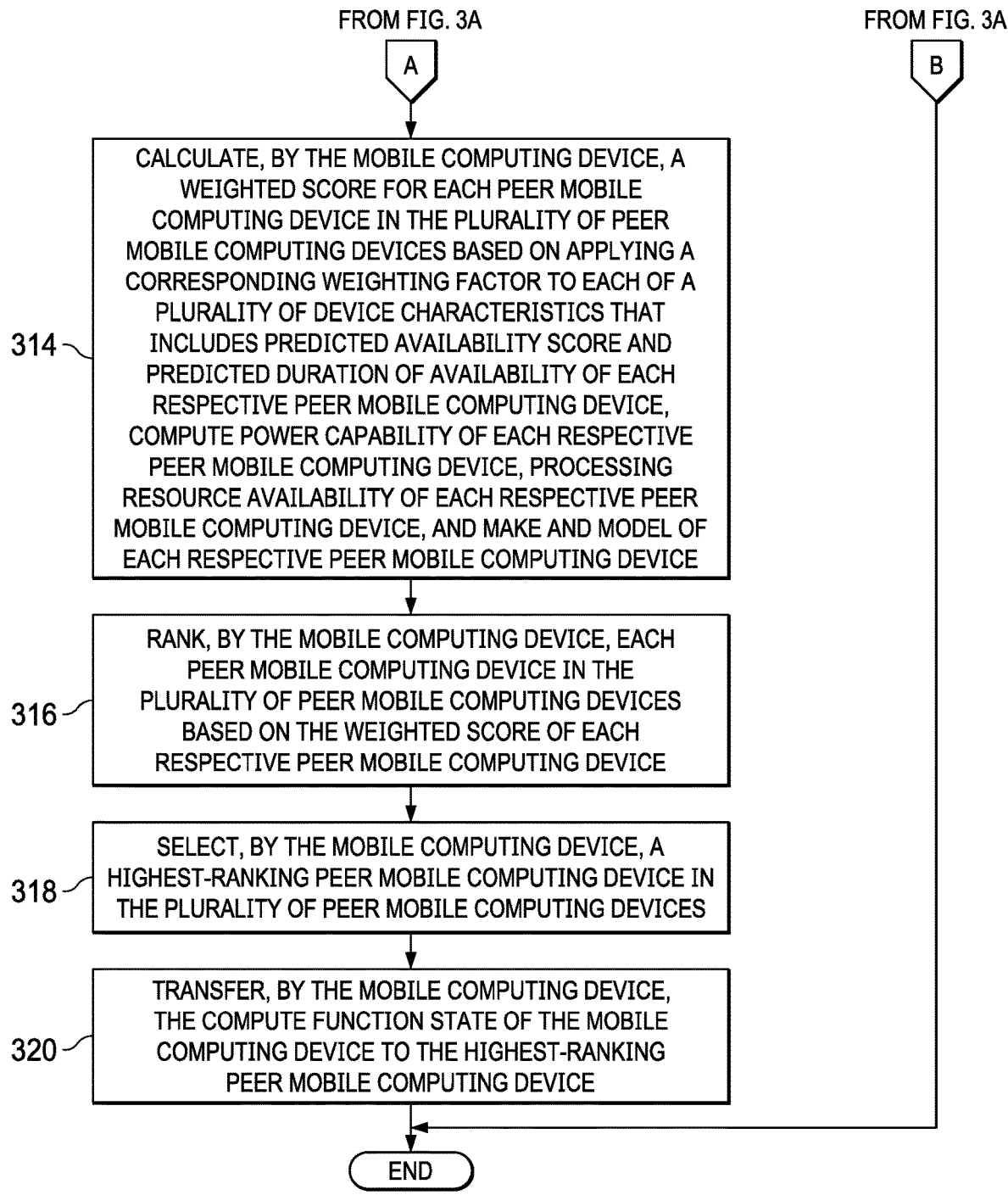

With reference now to FIGS. 3A-3B, a flowchart illustrating a process for peer-to-peer transfer of compute function state in an edge computing ecosystem is shown in accordance with an illustrative embodiment. The process shown in FIGS. 3A-3B may be implemented in a mobile computing device, such as, for example, mobile computing device 110 in FIG. 1 or data processing system 200 in FIG. 2.

The process begins when the mobile computing device receives an availability score corresponding to the mobile computing device on a periodic basis (step 302). In response to receiving the availability score corresponding to the mobile computing device in step 302, the mobile computing device makes a determination as to whether the availability score is less than a predefined minimum availability score threshold level (step 304). If the mobile computing device determines that the availability score is not less than the predefined minimum availability score threshold level, no output of step 304, then the process returns to step 302 where the mobile computing device waits to receive another availability score.

If the mobile computing device determines that the availability score is less than the predefined minimum availability score threshold level, yes output of step 304, then the mobile computing device determines departure coordinates of the mobile computing device from the edge computing ecosystem and departure time (step 306). In addition, the mobile computing device identifies at least one peer mobile computing device having a corresponding availability score greater than the predefined minimum availability score threshold level, a corresponding security profile that at least matches a security profile of the mobile computing device, and a corresponding compute power capability that at least matches a compute power capability of the mobile computing device (step 308).

Further, the mobile computing device makes a determination as to whether the at least one peer mobile computing device is a plurality of peer mobile computing devices (step 310). If the mobile computing device determines that the at least one peer mobile computing device is not a plurality of peer mobile computing devices (i.e., one peer mobile computing device), no output of step 310, then the mobile computing device transfers a compute function state of the mobile computing device to the at least one peer mobile computing device (step 312). Thereafter, the process terminates.

If the mobile computing device determines that the at least one peer mobile computing device is a plurality of peer mobile computing devices (i.e., two or more peer mobile computing devices), yes output of step 310, then the mobile computing device calculates a weighted score for each peer mobile computing device in the plurality of peer mobile computing devices based on applying a corresponding weighting factor to each of a plurality of device characteristics that includes predicted availability score and predicted duration of availability of each respective peer mobile computing device, compute power capability of each respective peer mobile computing device, processing resource availability of each respective peer mobile computing device, and make and model of each respective peer mobile computing device (step 314). Furthermore, the mobile computing device ranks each peer mobile computing device in the plurality of peer mobile computing devices based on the weighted score of each respective peer mobile computing device (step 316).

The mobile computing device selects a highest-ranking peer mobile computing device in the plurality of peer mobile computing devices (step 318). The mobile computing device transfers the compute function state of the mobile computing device to the highest-ranking peer mobile computing device (step 320). Thereafter, the process terminates.

Thus, illustrative embodiments of the present invention provide a computer-implemented method, computer system, and computer program product for peer-to-peer transfer of compute function state in an edge computing ecosystem. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for peer-to-peer transfer of compute function state in an edge computing ecosystem, the method comprising:

receiving, by a mobile computing device, an availability score corresponding to the mobile computing device on a periodic basis;

determining, by the mobile computing device, whether the availability score is less than a predefined minimum availability score threshold level;

responsive to the mobile computing device determining that the availability score is less than the predefined minimum availability score threshold level, determining, by the mobile computing device, departure coordinates of the mobile computing device from the edge computing ecosystem and departure time;

identifying, by the mobile computing device, at least one peer mobile computing device having a corresponding availability score greater than the predefined minimum availability score threshold level, a corresponding security profile that at least matches a security profile of the mobile computing device, and a corresponding compute power capability that at least matches a compute power capability of the mobile computing device, wherein the at least one peer mobile computing device is not currently a part of the edge computing ecosystem and is predicted to be available within the edge computing ecosystem at the mobile computing device departure time from the edge computing ecosystem; and transferring, by the mobile computing device, a compute function state of the mobile computing device to the at least one peer mobile computing device.

2. The method of claim 1 further comprising:

identifying, by the mobile computing device, a plurality of peer mobile computing devices having corresponding availability scores greater than the predefined minimum availability score threshold level, corresponding security profiles that at least match the security profile of the mobile computing device, and corresponding compute power capabilities that at least match the compute power capability of the mobile computing device;

calculating, by the mobile computing device, a weighted score for each peer mobile computing device in the plurality of peer mobile computing devices based on applying a corresponding weighting factor to each of a plurality of device characteristics that includes a predicted availability score and predicted duration of availability corresponding to each respective peer mobile computing device, compute power capability corresponding to each respective peer mobile computing device, processing resource availability corresponding to each respective peer mobile computing device, and make and model corresponding to each respective peer mobile computing device;

ranking, by the mobile computing device, each peer mobile computing device in the plurality of peer mobile computing devices based on the weighted score of each respective peer mobile computing device;

selecting, by the mobile computing device, a highest-ranking peer mobile computing device in the plurality of peer mobile computing devices; and transferring, by the mobile computing device, the compute function state of the mobile computing device to the highest-ranking peer mobile computing device.

3. The method of claim 2, wherein the processing resource availability corresponding to each respective peer mobile computing device includes available battery charge, available storage capacity, and available memory capacity of each respective peer mobile computing device.

4. The method of claim 1, wherein the availability score corresponding to the mobile computing device is based on at least one of volume of data generated by another device within the edge computing ecosystem, available computing power, storage, and memory of the mobile computing device, current activity being performed by a user of the mobile computing device in the edge computing ecosystem, electronic calendar entries scheduled to occur at a location within an area of the edge computing ecosystem, historical availability patterns of the mobile computing device within the edge computing ecosystem, speech analysis of the user of the mobile computing device, historical correlation among mobile computing device users within the edge computing ecosystem, historical profile of the user of the mobile computing device, data collected from internal sensors of the mobile computing device indicating mobility pattern, speed of movement, direction of movement, and relative position of the mobile computing device within the edge computing ecosystem, and manual input from the user of the mobile computing device.

5. The method of claim 1, wherein the mobile computing device calculates the availability score corresponding to the mobile computing device.

6. The method of claim 1, wherein a local edge server within the edge computing ecosystem calculates the availability score corresponding to the mobile computing device.

7. The method of claim 1, wherein the mobile computing device processes data generated by another device, which does not have compute capacity to process the data, when the mobile computing device is part of the edge computing ecosystem prior to the mobile computing device departing from the edge computing ecosystem.

8. The method of claim 7, wherein the other device is an Internet of Things sensor within the edge computing ecosystem.

9. The method of claim 7, wherein the mobile computing device stops processing the data generated by the another device, saves the compute function state corresponding to the processing of the data, transfers the compute function state to the at least one peer mobile computing device, and requests acknowledgement from the at least one peer mobile computing device regarding receipt of the compute function state.

10. A mobile computing device for peer-to-peer transfer of compute function state in an edge computing ecosystem, the mobile computing device comprising:

a bus system;

a storage device connected to the bus system, wherein the storage device stores program instructions; and a processor connected to the bus system, wherein the processor executes the program instructions to:

receive an availability score corresponding to the mobile computing device on a periodic basis;

determine whether the availability score is less than a predefined minimum availability score threshold level;

determine departure coordinates of the mobile computing device from the edge computing ecosystem and departure time in response to determining that the availability score is less than the predefined minimum availability score threshold level;

identify at least one peer mobile computing device having a corresponding availability score greater than the predefined minimum availability score threshold level, a corresponding security profile that at least matches a security profile of the mobile computing device, and a corresponding compute power capability that at least matches a compute power capability of the mobile computing device, wherein the at least one peer mobile computing device is not currently a part of the edge computing ecosystem and is predicted to be available within the edge computing ecosystem at the mobile computing device departure time from the edge computing ecosystem; and transfer a compute function state of the mobile computing device to the at least one peer mobile computing device.

11. The mobile computing device of claim 10, wherein the processor further executes the program instructions to:
identify a plurality of peer mobile computing devices having corresponding availability scores greater than the predefined minimum availability score threshold level, corresponding security profiles that at least match the security profile of the mobile computing device, and corresponding compute power capabilities that at least match the compute power capability of the mobile computing device;
calculate a weighted score for each peer mobile computing device in the plurality of peer mobile computing devices based on applying a corresponding weighting factor to each of a plurality of device characteristics that includes a predicted availability score and predicted duration of availability corresponding to each respective peer mobile computing device, compute power capability corresponding to each respective peer mobile computing device, processing resource availability corresponding to each respective peer mobile computing device, and make and model corresponding to each respective peer mobile computing device;
rank each peer mobile computing device in the plurality of peer mobile computing devices based on the weighted score of each respective peer mobile computing device;
select a highest-ranking peer mobile computing device in the plurality of peer mobile computing devices; and
transfer the compute function state of the mobile computing device to the highest-ranking peer mobile computing device.

12. The mobile computing device of claim 11, wherein the processing resource availability corresponding to each respective peer mobile computing device includes available battery charge, available storage capacity, and available memory capacity of each respective peer mobile computing device.

13. The mobile computing device of claim 11, wherein the availability score corresponding to the mobile computing device is based on at least one of volume of data generated by another device within the edge computing ecosystem, available computing power, storage, and memory of the mobile computing device, current activity being performed by a user of the mobile computing device in the edge computing ecosystem, electronic calendar entries scheduled to occur at a location within an area of the edge computing ecosystem, historical availability patterns of the mobile computing device within the edge computing ecosystem, speech analysis of the user of the mobile computing device, historical correlation among mobile computing device users within the edge computing ecosystem, historical profile of the user of the mobile computing device, data collected from internal sensors of the mobile computing device indicating mobility pattern, speed of movement, direction of movement, and relative position of the mobile computing device within the edge computing ecosystem, and manual input from the user of the mobile computing device.

14. The mobile computing device of claim 11, wherein the mobile computing device calculates the availability score corresponding to the mobile computing device.

15. A computer program product for peer-to-peer transfer of compute function state in an edge computing ecosystem, the computer program product comprising a computer readable storage medium having program instructions embodied therewith, the program instructions executable by a mobile computing device to cause the mobile computing device to perform a method comprising:
receiving, by the mobile computing device, an availability score corresponding to the mobile computing device on a periodic basis;
determining, by the mobile computing device, whether the availability score is less than a predefined minimum availability score threshold level;
responsive to the mobile computing device determining that the availability score is less than the predefined minimum availability score threshold level, determining, by the mobile computing device, departure coordinates of the mobile computing device from the edge computing ecosystem and departure time;
identifying, by the mobile computing device, at least one peer mobile computing device having a corresponding availability score greater than the predefined minimum availability score threshold level, a corresponding security profile that at least matches a security profile of the mobile computing device, and a corresponding compute power capability that at least matches a compute power capability of the mobile computing device, wherein the at least one peer mobile computing device is not currently a part of the edge computing ecosystem and is predicted to be available within the edge computing ecosystem at the mobile computing device departure time from the edge computing ecosystem; and
transferring, by the mobile computing device, a compute function state of the mobile computing device to the at least one peer mobile computing device.

16. The computer program product of claim 15 further comprising:
identifying, by the mobile computing device, a plurality of peer mobile computing devices having corresponding availability scores greater than the predefined minimum availability score threshold level, corresponding security profiles that at least match the security profile of the mobile computing device, and corresponding compute power capabilities that at least match the compute power capability of the mobile computing device;
calculating, by the mobile computing device, a weighted score for each peer mobile computing device in the plurality of peer mobile computing devices based on applying a corresponding weighting factor to each of a plurality of device characteristics that includes a predicted availability score and predicted duration of availability corresponding to each respective peer mobile computing device, compute power capability corresponding to each respective peer mobile computing device, processing resource availability corresponding to each respective peer mobile computing device, and make and model corresponding to each respective peer mobile computing device;
ranking, by the mobile computing device, each peer mobile computing device in the plurality of peer mobile computing devices based on the weighted score of each respective peer mobile computing device;
selecting, by the mobile computing device, a highest-ranking peer mobile computing device in the plurality of peer mobile computing devices; and
transferring, by the mobile computing device, the compute function state of the mobile computing device to the highest-ranking peer mobile computing device.

17. The computer program product of claim 16, wherein the processing resource availability corresponding to each respective peer mobile computing device includes available battery charge, available storage capacity, and available memory capacity of each respective peer mobile computing device.

18. The computer program product of claim 15, wherein the availability score corresponding to the mobile computing device is based on at least one of volume of data generated by another device within the edge computing ecosystem, available computing power, storage, and memory of the mobile computing device, current activity being performed by a user of the mobile computing device in the edge computing ecosystem, electronic calendar entries scheduled to occur at a location within an area of the edge computing ecosystem, historical availability patterns of the mobile computing device within the edge computing ecosystem, speech analysis of the user of the mobile computing device, historical correlation among mobile computing device users within the edge computing ecosystem, historical profile of the user of the mobile computing device, data collected from internal sensors of the mobile computing device indicating mobility pattern, speed of movement, direction of movement, and relative position of the mobile computing device within the edge computing ecosystem, and manual input from the user of the mobile computing device.

19. The computer program product of claim 15, wherein the mobile computing device calculates the availability score corresponding to the mobile computing device.

* * * * *